INVENTOR
ANTHONY EDWARD THOMAS NYE
ATTORNEY

United States Patent Office 2,988,494
Patented June 13, 1961

2,988,494
PROTECTIVE EQUIPMENT FOR A
NUCLEAR REACTOR
Anthony Edward Thomas Nye, Clifton, near Rugby, England, assignor to The British Thomson-Houston Company Limited, London, England, a British company
Filed Oct. 21, 1957, Ser. No. 691,383
Claims priority, application Great Britain Oct. 26, 1956
1 Claim. (Cl. 204—193.2)

This invention relates to protective apparatus for nuclear reactors having a gas coolant.

Since the input and output gas temperatures and the gas pressure are kept constant under normal operating conditions then:

Nuclear power $\propto$ gas mass flow=K.mass flow

If the nuclear power exceeds K.mass flow a rise in reactor temperature is produced. If the excess power is too great to be handled by normal rod control or gas circulator control it is necessary to shut down the reactor.

According to the present invention protective equipment for a gas cooled nuclear reactor comprises means for obtaining a first signal voltage having a magnitude representative of the nuclear power output of the reactor, means for obtaining a second signal voltage representative of the total gas flow in the reactor, means for comparing said signals and means for actuating shut down apparatus for the reactor when the ratio of the first signal voltage to the second signal voltage exceeds a predetermined value.

The signal representing gas coolant flow may be obtained from apparatus responsive to the rate of flow, i.e. to the gas circulator speed. This is permissible when the pressure ratio of the circulator is very low, and the working temperatures and pressures are substantially constant at all flow rates in the range considered.

In carrying out the invention alternating voltage signals proportional to individual gas circulator speeds may be provided by an appropriate number of inductor type alternators, the separate signals being subsequently added together and compared with a signal proportional to the nuclear power by means of a shut down amplifier. Means may also provide lower and upper limits to the voltage representing circulator speed.

The inductor type alternators providing the voltage proportional to speed may comprise permanent magnet inductor type alternators, each of the rotors being formed by teeth on one of the couplings between the motor and the blower, to provide an alternating voltage of amplitude proportional to the speed of the circulator. This voltage is also variable in frequency, but this is of no consequence as it is rectified.

In order that the invention may be more fully understood reference will now be made to the accompanying drawings in which.

Figure 1:
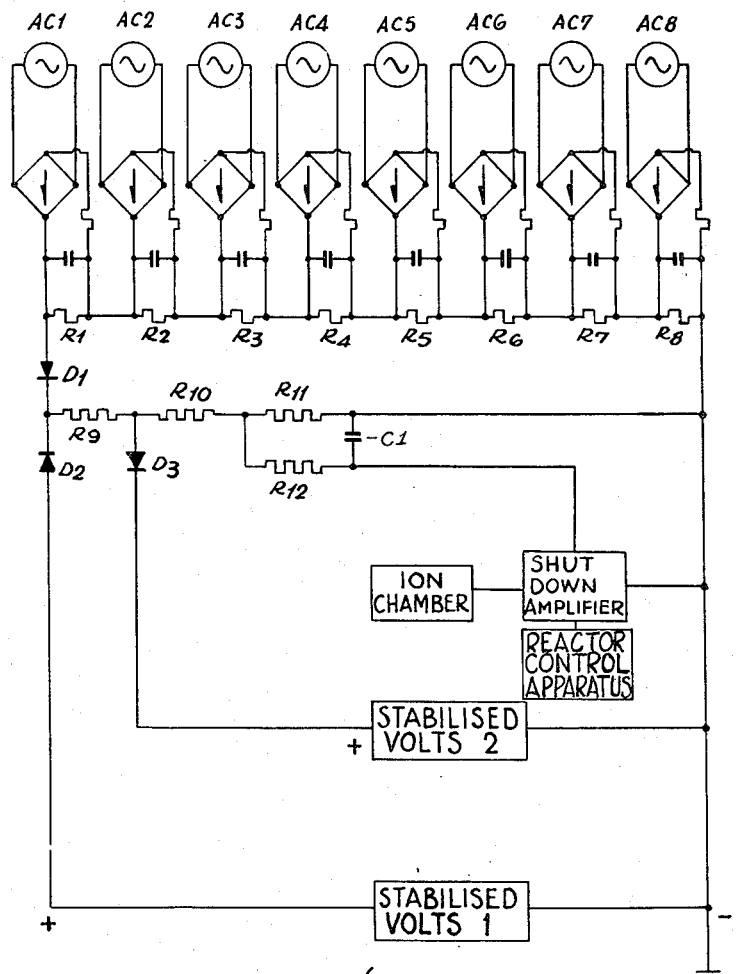
FIG. 1 is a general electrical circuit diagram explaining the invention.

As shown in FIG. 1 the output voltage from each of the alternators AC1–AC8 is rectified, smoothed and applied across associated resistances R1–R8 which resistances are all connected in series, so that the total D.C. voltage across the circuit is the sum of all the individual voltages. This is applied through a rectifier D1 across a potentiometer formed by resistances R9, R10 and R11 from which is obtained a trip setting voltage proportional to circular speed, this normally being a predetermined proportion of the total output voltage of the alternator system.

The trip setting voltage is applied through the smoothing circuit formed by R12 and C1 to one input terminal of a comparison device known in the art as a shut down amplifier. This device compares two input voltages, in this case one proportional to mass flow and the other to nuclear power the ratio of the second voltage to the first voltages exceeds a predetermined value, the output of the amplifier operates to shut down the reactor by means of the reactor control apparatus.

In certain reactors it may be required to run the reactor at low power without the coolant circulation running, and in this case it is necessary to provide a minimum trip setting for the shut down amplifier. This may be obtained, as shown in FIG. 1, by applying across the potentiometer chain R9, R10 and R11, to which is also applied the sum of the rectified alternator voltages, a stabilised D.C. voltage from an external source 1. This voltage is very small compared with the total voltage normally provided by the alternators, and the rectifiers D1 and D2 in FIG. 1 prevent interaction between the two voltage sources.

It will be appreciated that this feature is not normally included and is only shown by way of example. Normally the diodes D1 and D2 would not be used, and the end of R1 would be directly connected to one end of R9, and the stabilised voltage source 1 would not be used.

It is also necessary in the interests of safety to provide an upper limit to the trip setting, and this is arranged by providing a D.C. stabilised voltage supply from voltage source 2, which is normally isolated from the potentiometer by the rectifier D3, but which draws current when the signal voltage exceeds a predetermined value. This current causes a potential drop in the resistance R9 and prevents the voltage applied to the shut down amplifier from exceeding a predetermined value.

If one circulator should suddenly cease to operate the associated alternator will no longer provide a voltage and the reactor would be shut down. This may not be necessary however, since automatic means for adjusting the nuclear power to the new conditions are available in the system. This adjustment can only be made gradually, however, and means are therefore included in the present invention for delaying the shutting down of the reactor until the automatic power controlling means has had the opportunity to operate. For this purpose the resistor R12 and the capacitor C1 are included in the circuit to introduce the desired time constant for transient effects.

Figure 2:
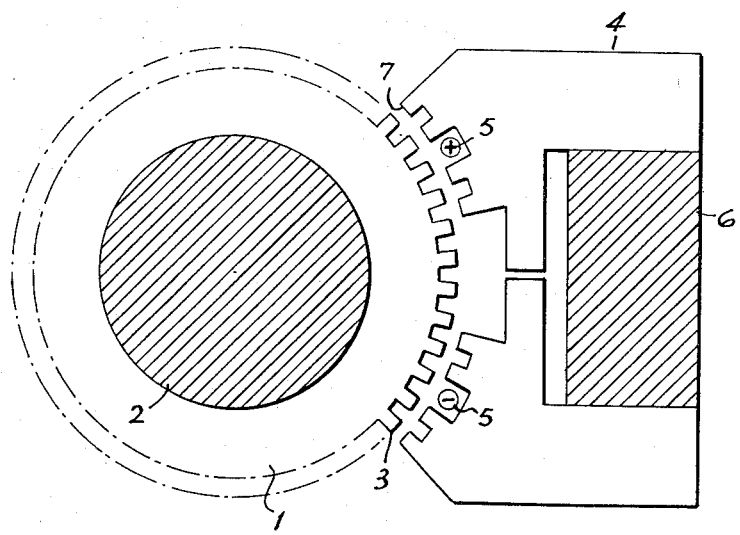
FIG. 2 is a detail view of one of the alternators.

FIG. 2 shows the construction of a suitable inductor alternator. This comprises an armature 1 mounted on a shaft 2 rotating with the circulator.

The armature is provided with teeth 3 around its periphery. A stator 4 carries a winding 5 in slots and has a permanent flux produced by a permanent magnet 6. When the armature rotates the teeth 3 move past teeth 7 formed on the interior face of the stator and so produce a varying reluctance in the magnetic path and hence an alternating E.M.F. is induced in the winding 5.

What I claim is:

Protective equipment for a gas cooled nuclear reactor comprising means for obtaining a first signal voltage having a magnitude representative of the nuclear power output of the reactor, means for obtaining a second signal voltage representative of the total gas flow in the reactor, comparison means for comparing said first and second signal voltages and for producing a control signal of a value dependent upon the ratio of said first signal voltage to said second signal voltage, control apparatus adapted to shut down the reactor, means for actuating said control apparatus when said control signal exceeds a predetermined value, means for biasing said second signal voltage so that the reactor may be operated at low output with negligible gas flow without causing the reactor to be shut down, and means for limiting the maximum value of said second voltage which is applied to said comparison means in order to limit the maximum value of the nuclear power output.

References Cited in the file of this patent

Proceedings of the 1953 Conference on Nuclear Engineering (Univ. of California, Berkeley, Sept. 9–11, 1953), pages D-1 through D-7.

IRE Transactions of Nuclear Science, vol. NS–1, No. 1 (September 1954), pages 8–11 (article by Stubbs).

Schultz: Control of Nuclear Reactors and Power Plants, McGraw-Hill (1955), pages 62–64.

Nucleonics, vol. 11, No. 6, June 1953, page 52.

Proceedings of the International Conference on the Peaceful Uses of Atomic Energy, Aug. 8–20, 1955; United Nations, New York; vol. 3, page 108.